UNITED STATES PATENT OFFICE.

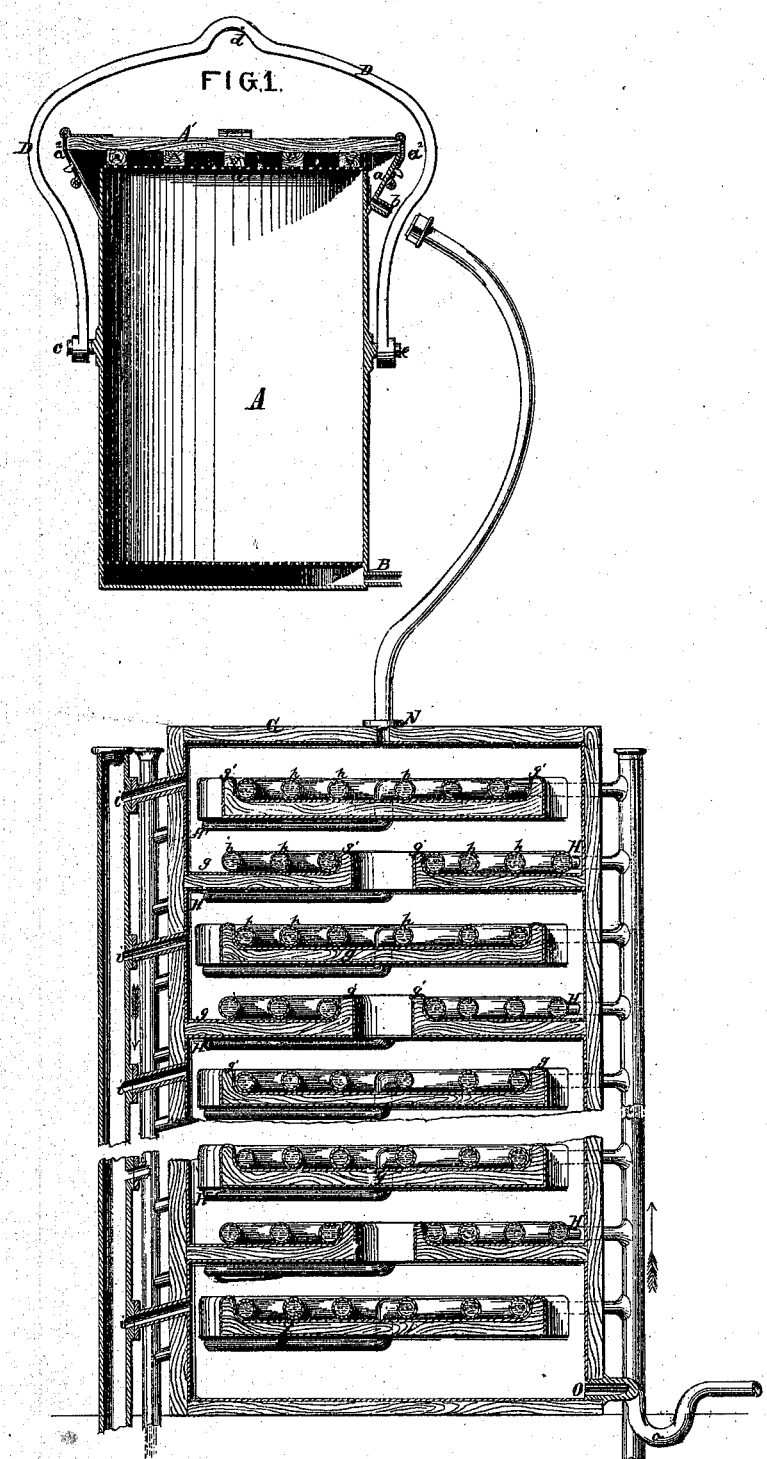

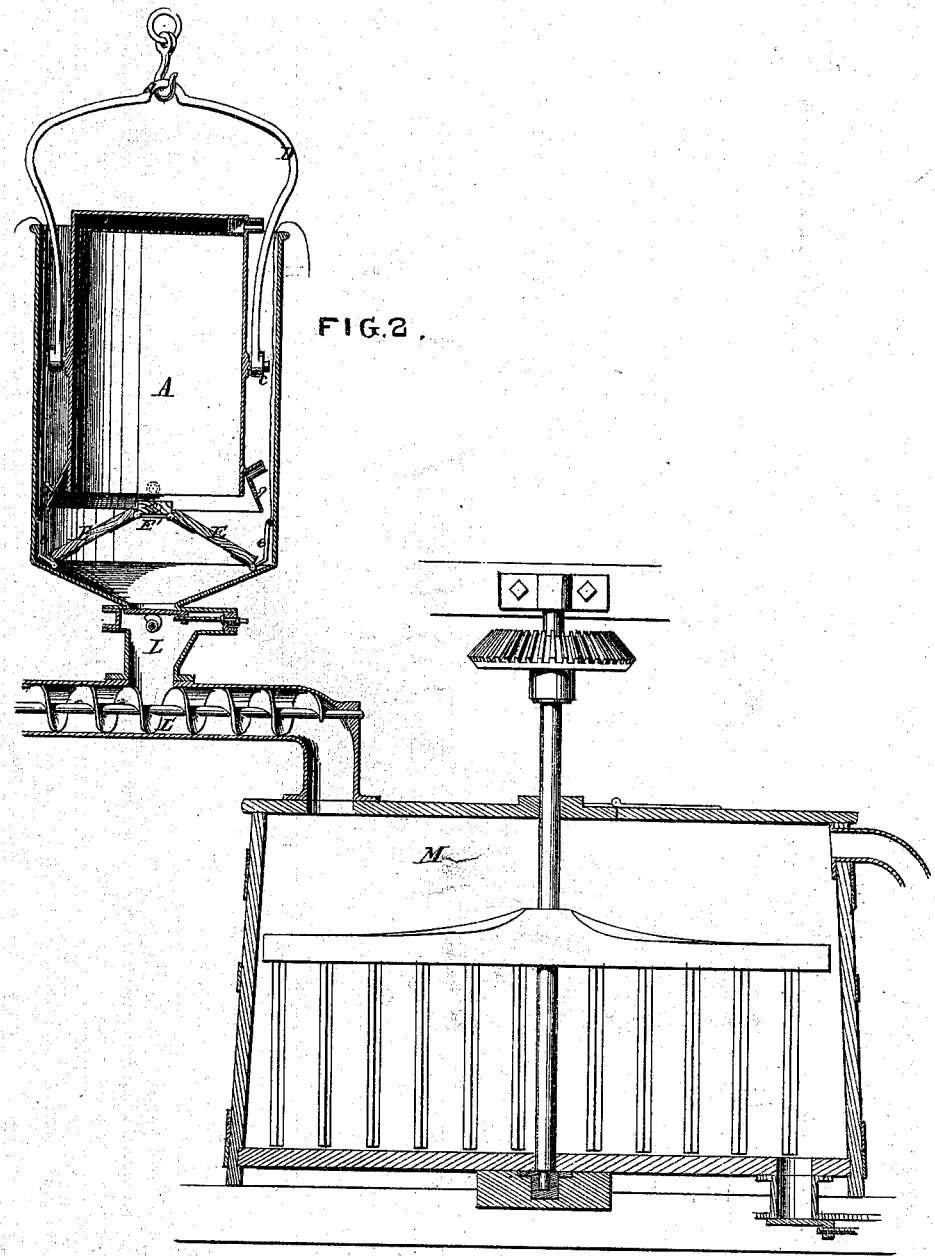

ELIAS S. HUTCHINSON, OF BALTIMORE, MARYLAND.

IMPROVEMENT IN APPARATUS AND PROCESSES FOR REMOVING OIL FROM GRAIN, SEEDS, &c

Specification forming part of Letters Patent No. 112,350, dated March 7, 1871.

I, ELIAS S. HUTCHINSON, of Baltimore, Maryland, have invented an Improved Apparatus for Removing Oil from Vegetable and other Matter, of which the following is a specification:

Nature and Objects of the Invention.

The first part of my invention relates to a vat, in which the oil contained in vegetable or other substances may be removed, by means of a chemical, at a place convenient to the tank or reservoir containing the chemical, and the vat, with its contents, transported thence to the evaporating-tank in order to deposit the partially-dried substance therein, that it may be freed from the chemical still remaining in it; and the second part of the invention relates to a still for separating the oil from the chemical employed to extract it after the two, in a state of mixture or combination, have been withdrawn from the meal.

Description of the Accompanying Drawing.

Figure 1 is a vertical section of a vat and of the still employed to separate the chemical from the oil. Fig. 2 is a vertical section, showing a tank in the act of discharging its contents into the hopper of a mash-tun.

General Description.

A is the body of the vat or vessel above referred to, which may be nearly cylindrical, but of slightly greater diameter at top than at bottom, and of any convenient portable size— for example, four feet high, two and one-half feet in diameter at top, and two feet four inches at bottom. It has a tube, B, (with a faucet,) at one side, near the bottom, protected by an interior diaphragm, and a diaphragm or perforated cover, $a'$, at top, attached to an exterior removable cap, A', (which may be held down by catches $a''$,) so that the two can be simultaneously placed on or lifted from the vat.

On the outside of the vat A, extending slightly above its top, is an annular channel, $a$, for receiving the overflow from the vat, having a nozzle, $b$, through which the liquid flows off.

On each side of the exterior of the vessel, and slightly above its center of gravity, is a trunnion, $c$, by which the handle or bail D is attached. The handle has a bend, $d$, at its upper part, by which the vat may be suspended.

The vat may further be provided with a separate cover, E E', consisting of a center bar and two flaps, which is fixed on, when desired, so as to be readily removable, by means of lugs on the ends of the bar E', engaged by hooks on the vat, as illustrated in Fig. 2, or in other suitable manner, so as to make it fit closely.

The hinged flaps E are made fast by spring or hinged catches $e$, or other suitable contrivances, preferably so arranged that by means of a cord or cords connected therewith the catches may be released and the flaps allowed to drop when the vat is inverted, and permit the meal to run out.

If preferred, the first cover, A', of the vat may be made to serve for dumping by constructing it with a central bar, either removably or permanently attached, and hinged flaps held by catches, as before described, the perforated diaphragm $a'$ being made in three corresponding sections attached to the cover. The necessity for a separate cover for dumping may thus be entirely avoided.

A truck is employed for transporting the vats from place to place. It consists of a frame mounted on wheels, and provided with a windlass for raising and lowering said vats.

G is the still above referred to. It consists of a vessel of cylindrical or other suitable form, with shelves $g\ g$, one above another, at convenient distances—say six inches—apart, having ledges $g'$ of sufficient height to retain a stratum of oil deep enough to cover the coils of pipe shown in section at $h\ h\ h$. Each shelf supports a coil of this pipe, which enters the shell of the still at H and passes out at H'. The still is provided with an aperture, N, at top, for the entry of the commingled oil and chemical, and one, O, at bottom, for its discharge. The one at bottom, O, is provided with a trap, $o$, so as to permit the free egress of the oil, but prevent the entrance of air or escape of vapor. The still has also apertures and pipes $i\ i\ i$, at proper intervals, in its sides, to conduct off the vapor of bisulphide of carbon or other chemical as it is evolved from the oil.

A convenient size and arrangement for the still is four feet diameter and twelve feet in height, the shelves being of form adapted to the sectional shape of the vat and about six inches apart, the outer shell or jacket of wood lined with lead, of which metal the pipes are also made, as being less liable to injure the oil, though any other suitable material may be employed for these purposes.

Operation.

The vats A, of which twenty or more may be employed, are filled with meal to their proper capacity. This may, if more convenient, be done at the place or apartment where the meal is stored, after which the vats are removed by the truck above described, specially adapted for the purpose, or other convenient means, to a spot contiguous to the chemical reservoir or reservoirs. The cap and diaphragm A' a' are then put on, and the opening at bottom B placed in communication with a vessel containing the chemical, which passes through the meal, combining with its oil, and overflows at top, through the diaphragm a', into the channel a, whence it is conducted into a proper receptacle. When the oil is all removed the meal is drained, and, by means of the truck, the vat is lifted and conveyed to the evaporating-tank M, when, if the cover A' is hingeless, as shown in Fig. 1, it is taken off and replaced by the hinged or flap cover.

The evaporating-tank which I employ in connection with these vats is provided with a hopper, as shown in Fig. 2, funnel-shaped at bottom, and having an outlet-pipe, L, containing an endless screw, L', of sufficient diameter to fit therein, but revolve freely, and rotated in any suitable manner. Any evaporator, however, of suitable capacity and proper form may be adapted for use with my portable vat by attaching to the head thereof a hopper of sufficient size and suitable construction to receive the contents of the vat and allow their free entrance to the evaporator. In Fig. 2 the hopper is shown as attached to a mash-tub.

The vat being brought over, the hopper is inverted and partially lowered therein, the situation of the trunnions near the center of gravity enabling this to be readily done. The catches $e$ $e$ are then retracted, allowing the flaps E E to turn on their hinges and discharge the contents of the vat, which is then elevated and removed. The rotation of the endless screw L' forces the meal down through the tube L into the interior of the tank M.

The mixed oil and chemical which flows from the meal, as above described, is conducted to the still G either by flowing from a higher elevation or by pumping. Entering through the opening N in the head of the still, it flows onto the upper shelf, $g$, surrounding and covering the pipes $h$ $h$ $h$, and flowing though apertures onto the shelf below, and so on until it reaches the discharge-orifice at the bottom, through which the pure oil, having been by this time entirely freed from the chemical, flows to an appropriate reservoir.

The $CS_2$ or other chemical, as it is disengaged from the oil in the form of vapor, passes out of the still, through the pipes $i$, to a condenser or receptacle, where it is retained for future use.

Claims.

I claim as my invention—

1. The portable dumping-vat herein described, having a cap which can be opened sufficiently to allow the free discharge of the meal or contents, and yet be withdrawn with the vat, substantially as set forth.

2. The vat having perforated diaphragms at bottom and top and inlet and outlet pipes, constructed to be moved with a derrick or windlass, substantially as shown.

3. The hopper constructed to receive the contents of the vat, or a greater or lesser portion thereof, and having a screw-conveyer, substantially as set forth.

4. In combination with any apparatus for separating chemical from vegetable or other matter by evaporation, and afterward recovering it by condensation, one or more vats, arranged to be upset into a receptacle provided with a screw-conveyer or its equivalent, to feed it into the separator.

ELIAS S. HUTCHINSON.

Witnesses:
OCTAVIUS KNIGHT,
WM. H. BRERETON, Jr.